(12) United States Patent
Palzkill et al.

(10) Patent No.: US 6,848,282 B2
(45) Date of Patent: Feb. 1, 2005

(54) KINGPIN LOCK

(75) Inventors: Raymond G. Palzkill, Elkhorn, NE (US); Keith R. Feilmeier, Omaha, NE (US)

(73) Assignee: Gabriel Technologies Corp., Omaha, NE (US)

( * ) Notice: Subject to any disclaimer, the term of this patent is extended or adjusted under 35 U.S.C. 154(b) by 0 days.

(21) Appl. No.: 10/681,852

(22) Filed: Oct. 8, 2003

(65) Prior Publication Data

US 2004/0261470 A1 Dec. 30, 2004

Related U.S. Application Data

(60) Provisional application No. 60/417,567, filed on Oct. 10, 2002.

(51) Int. Cl.[7] .............................................. E05B 73/00
(52) U.S. Cl. ................................. 70/14; 70/58; 70/229
(58) Field of Search .................... 70/58, 258, 229–232, 70/14

(56) References Cited

U.S. PATENT DOCUMENTS

| 2,554,306 | A | * | 5/1951 | Mack ....................... 280/438.1 |
|---|---|---|---|---|
| 2,755,655 | A | * | 7/1956 | Maffey ........................ 70/232 |
| 3,415,085 | A | * | 12/1968 | Eble, Jr. ...................... 70/232 |
| 3,600,914 | A | * | 8/1971 | Johnson et al. ................ 70/72 |
| 3,798,938 | A | * | 3/1974 | McCullum .................... 70/417 |
| 3,922,897 | A | * | 12/1975 | Mickelson .................... 70/232 |
| 4,031,727 | A | * | 6/1977 | De Groat et al. ............. 70/232 |
| 4,132,093 | A | * | 1/1979 | McDorman, Sr. ............ 70/231 |
| 4,305,266 | A | * | 12/1981 | Lockwood ..................... 70/58 |
| 4,697,444 | A | * | 10/1987 | Maffey ........................ 70/232 |
| 4,704,883 | A | * | 11/1987 | Dykes ......................... 70/232 |
| 5,259,223 | A | * | 11/1993 | Nee ............................ 70/232 |
| 5,782,116 | A | * | 7/1998 | Ryan et al. ................... 70/209 |

* cited by examiner

Primary Examiner—John B. Walsh

(57) ABSTRACT

A kingpin lock includes a vertically-oriented tube with a conical shell formed by a plurality of gussets projecting radially from the tube. The gussets are triangular in shape, so that the conical shape tapers from the upper end to the lower end of the tube. A plunger type lock is mounted on the tube and is operable to move a securement pin into a notch on the kingpin to secure the kingpin within the tube, and to withdraw the pin from the notch to permit removal of the kingpin from the tube.

7 Claims, 3 Drawing Sheets

KINGPIN LOCK

CROSS-REFERENCES TO RELATED APPLICATIONS

Priority is claimed based upon U.S. Provisional Application Ser. No. 60/417,567, filed Oct. 10, 2002, entitled "Kingpin Lock".

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to apparatus for securing the kingpin of a trailer of a tractor-trailer combination, and more particularly to an improved kingpin lock for preventing unauthorized transport of a trailer having a kingpin-type hitch.

(2) Background Information

The trucking transportation industry is one of the major means of commerce in the United States and throughout the world. Because of the vast extent of this industry, it is not uncommon for thieves to look to this area to obtain goods for their illegal trade.

While the prior art security systems have been designed for the doors of trucks and other cargo containers, the majority of the industry ignores the risk of theft of the entire trailer. Currently, there is no known effective device for the prevention of theft of a full trailer/container.

BRIEF SUMMARY OF THE INVENTION

It is therefore a general object of the present invention to provide an improved theft-deterrent device for a trailer/container having a king pin.

A further object is to provide a king pin lock that is easy to install, remove and operate, yet is effective to deter theft.

These and other objects will be apparent to those skilled in the art.

The kingpin lock of the present invention includes a vertically-oriented tube with a conical shell formed by a plurality of gussets projecting radially from the tube. The gussets are triangular in shape, so that the conical shape tapers from the upper end to the lower end of the tube. A plunger type lock is mounted on the tube and is operable to move a securement pin into a notch on the kingpin to secure the kingpin within the tube, and to withdraw the pin from the notch to permit removal of the kingpin from the tube.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
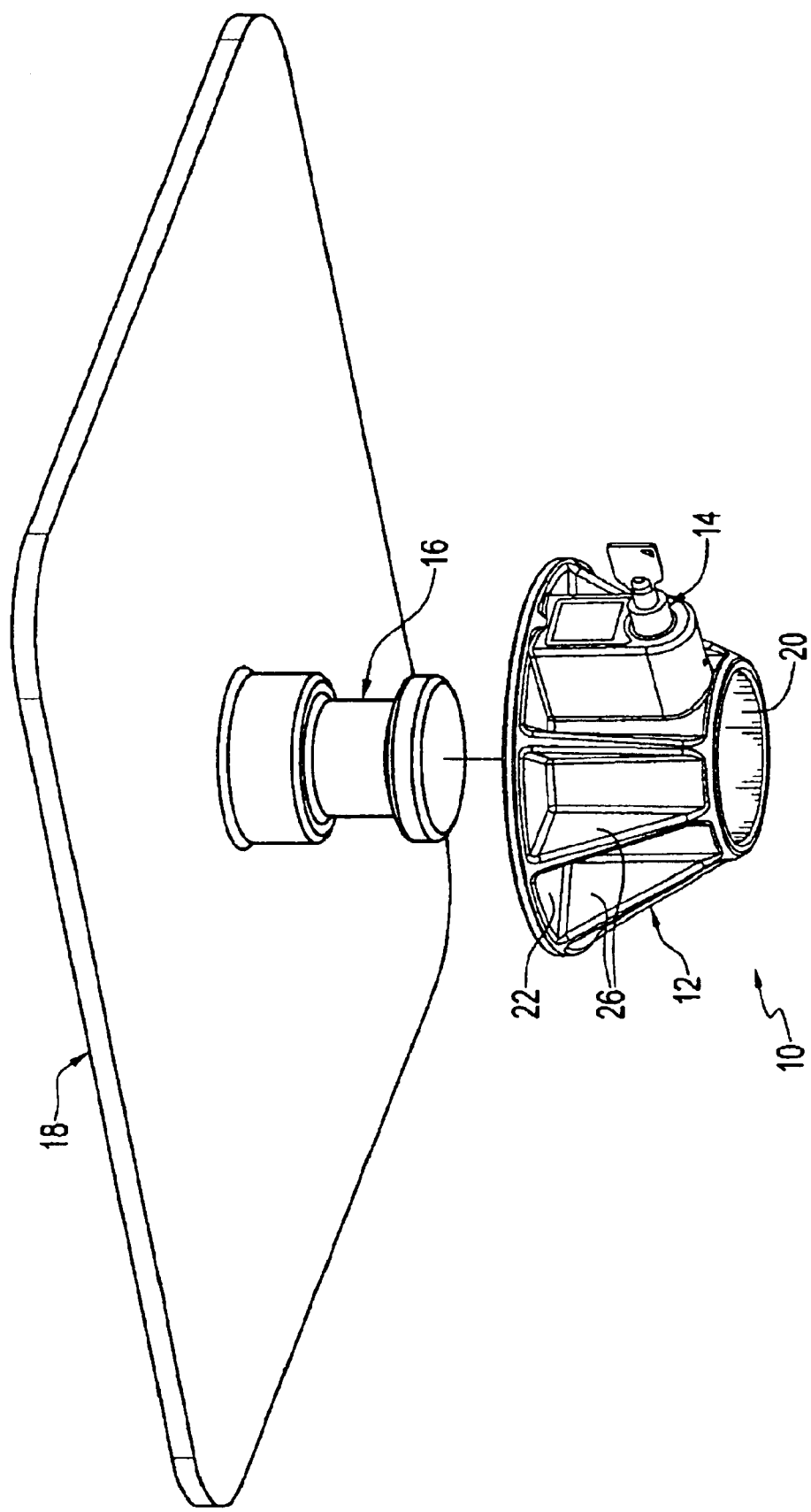
FIG. 1 is a pictorial view of a kingpin lock of the present invention shown ready for installation on a king pin of a trailer draw plate.

Referring now to the drawings, and more particularly to FIG. 1, the kingpin lock of the present invention is designated generally at 10 and includes a main body 12 and an operable push-button type lock 14. Lock 10 is designed for use on a kingpin 16 of a conventional type, which is installed on a trailer or container to permit transportability. In the disclosed embodiment, kingpin 16 is shown mounted on a trailer drawplate 18 and projects freely from a lower surface of the drawplate 18.

Main body 12 includes a central cylindrical tube 20 oriented vertically, and having a diameter sufficient to receive kingpin 16 therein. The upper end of main body 12 has a disc-shaped plate 22 formed thereon, with a central aperture 24 aligned with tube 20. Plate 22 is oriented perpendicular to tube 20 and will be positioned adjacent drawplate 18 when mounted on kingpin 16, as shown in FIGS. 2 and 3.

A plurality of triangular gussets 26 extend the length of tube 20 and have an upper edge affixed to the lower surface of plate 22 to support the plate and strengthen tube 20. The length of tube 20 is sufficient to enclose substantially the entire length of kingpin 16 when lock 10 is secured to the kingpin, as shown in FIGS. 2 and 3. Gussets 26 are arranged uniformly around the perimeter of tube 20 and project radially outwardly from the tube, to form a general conical-shaped shell tapering inwardly from plate 22 to the lower end of tube 20.

The use of gussets 26 to form the conical shell significantly decreases the weight of the overall structure, as compared to a shell formed of a solid conical mass. In addition, the weight of the kingpin lock is reduced without significantly decreasing the strength of the structure. The conical shape of the shell formed by the tapering edges of the gussets will deflect the fifth wheel plate on a tractor, to thereby prevent unauthorized connection and transport of the trailer/container.

Figure 2:
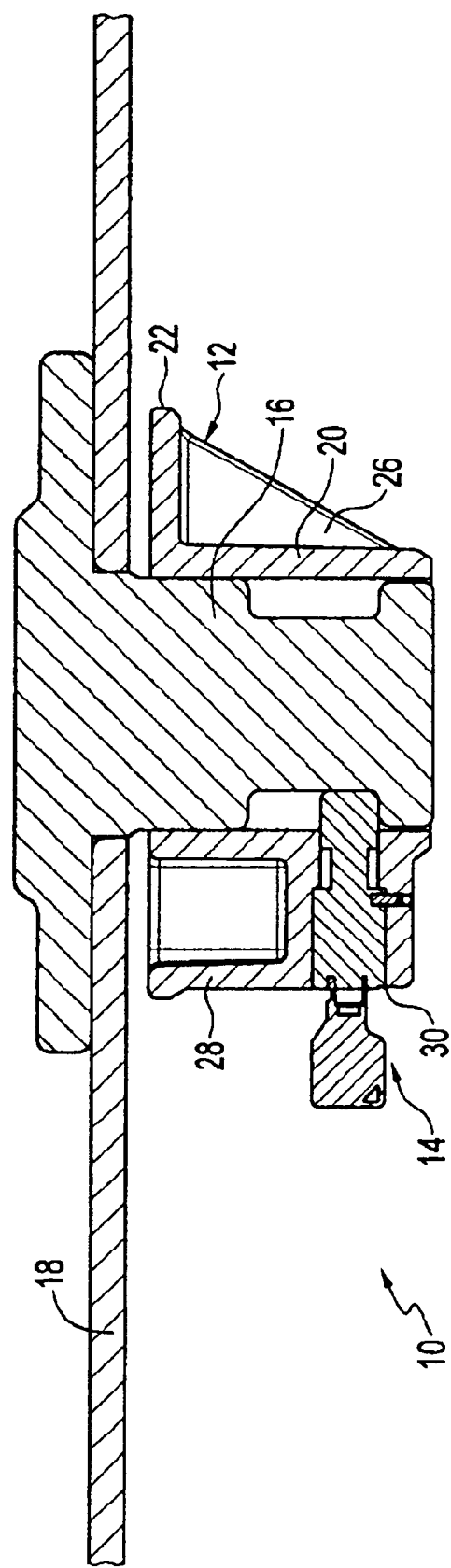
FIG. 2 is a vertical sectional view through the lock, king pin and trailer draw plate.
Figure 3:
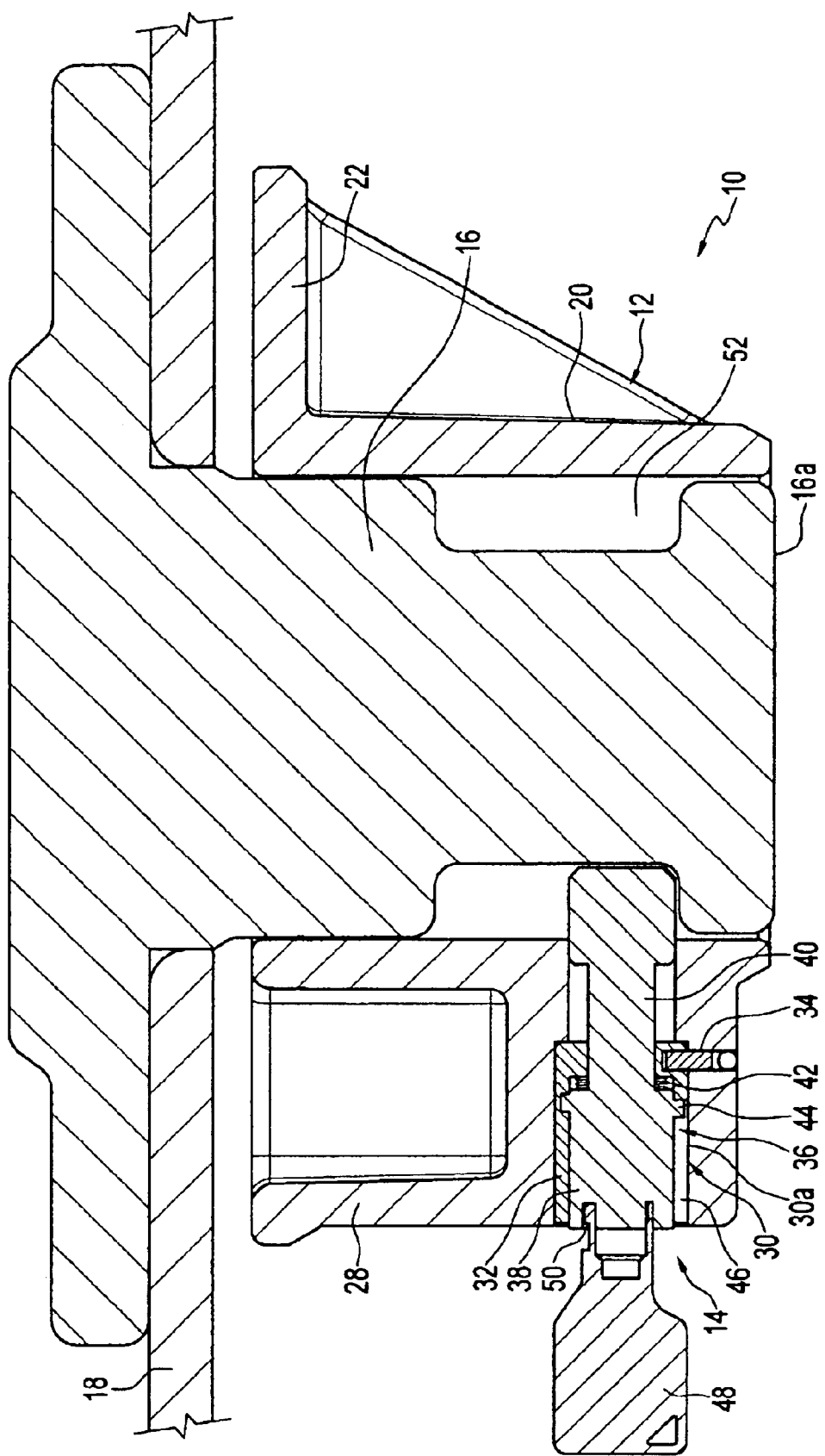
FIG. 3 is an enlarged view of a portion of the sectional view of FIG. 2.

Referring now to FIGS. 2 and 3, a lockbox housing 28 is affixed to the exterior sidewall of tube 20 and extends upwardly to plate 22. A horizontal central bore 30 extends inwardly through housing 28 and into the interior cavity of tube 20. Bore 30 has an outward portion 30a having a larger diameter than an inward portion 30b, and receives a conventional push-button type lock 14, well-known in the art. Lock 14 includes a cylinder 32 releasably secured within bore outward portion 30a by a set screw 34. A plunger 36 is slidably mounted within cylinder 32, and includes an outward plug portion 38 and an inward pin portion 40. Plug 38 has a larger diameter than at least an outward end of pin 40 such that a spring 42 around the outward end of pin 40 within bore outward portion 30a will bias plug 38 outwardly and out of bore 30. Plug 38 is retained in the locked position shown in FIG. 3 by the misalignment of tabs 44 from longitudinal keyways 46 in cylinder 32.

Rotation of plug 38 within cylinder 32 selectively aligns and misaligns the tabs 44 from the keyways 46 to lock and unlock the lock 14, in a fashion known in the art. A key 48 will selectively engage a key slot 50 in the outward exposed face of plug 38 to permit the rotation and locking and unlocking function.

Pin 40 of plunger 36 extends inwardly from and coaxial with plug 38 through the bore inward portion 30b and the interior cavity of tube 20 when lock 14 is in the locked position shown in FIG. 3. As shown in the drawing, kingpin 16 has an annular groove or notch 52 formed around its circumference and spaced slightly upwardly of the depending free end 16a. It can be seen that the inward end of pin 40 projects into this notch 52 when lock 14 is in the locked position, to thereby prevent withdrawal of the kingpin from the tube 20. Thus, pin 40 secures kingpin lock 10 from removal from kingpin 16 when lock 14 is in the locked position. In addition, the outer face of plug 38 is substantially flush with the outward wall of lockbox housing 28, when in the locked position, thereby reducing the chance of tampering with lock 14.

When lock 14 is in the unlocked position shown in FIG. 1, plug 38 will project outwardly from the lock housing 28, and the inward end of pin 40 will be withdrawn from the kingpin notch 52, to thereby release the kingpin lock from securement to kingpin 16.

Whereas the invention has been shown and described in connection with the preferred embodiments thereof, many modifications, substitutions and additions may be made which are within the intended broad scope of the appended claims.

What is claimed is:

1. A security device for a kingpin, comprising:
   a vertically-oriented tube having upper and lower ends and an inner diameter sufficient to slidably receive a kingpin of predetermined dimensions therein;
   a conical shaped shell mounted on the tube and tapering from a large diameter at an upper end to a small diameter at a lower end, the shell having a central axis coaxial with a central axis of the tube; and
   an operable lock mounted on said tube, said lock operable between a locked position securing a horizontal pin in a first position projecting within an interior cavity of the tube, and an unlocked position permitting movement of the pin to a second position withdrawn from the interior cavity of the tube;
   wherein said shell is formed of a plurality of gussets projecting radially outwardly from the tube.

2. The security device of claim 1, wherein said gussets are generally triangular in shape.

3. The security device of claim 1, further comprising a lock housing substantially enclosing said lock on the tube, said housing having a horizontal bore formed therethrough and communicating with the interior cavity of the tube, and wherein:
   said lock is a plunger-type lock with a cylindrical plug coaxially mounted to an outward end of the pin;
   said plug is operably mounted within a cylinder for movement between a locked position within the cylinder and an unlocked position projected at least partially out of the cylinder; and
   said lock cylinder is mounted within the bore and coaxial therewith.

4. In combination:
   a cargo container having a kingpin depending from a bottom surface thereof;
   said kingpin being substantially cylindrical in shape, with an annular notch around the circumference thereof, space above a lower end; and
   a security device removably connected to the kingpin to prevent connection of the kingpin to a fifth wheel plate on a tractor, said security device comprising:
      a vertically-oriented tube having upper and lower ends and an inner diameter sufficient to slidably receive said kingpin therein:
      a conical shaped shell mounted on the tube and tapering from a large diameter at an upper end to a small diameter at a lower end, the shell having a central axis coaxial with a central axis of the tube; and
      an operable lock mounted on said tube, said lock operable between a locked position securing a horizontal pin in a first position projecting into the kingpin notch within the tube, and an unlocked position withdrawn from the kingpin notch;
   wherein said shell is formed of a plurality of gussets projecting radially outwardly from the tube.

5. The combination of claim 4, wherein said gussets are generally triangular in shape.

6. The combination of claim 4, further comprising a lock housing substantially enclosing said lock on the tube, said housing having a horizontal bore formed therethrough and communicating with the interior cavity of the tube, and wherein:
   said lock is a plunger-type lock with a cylindrical plug coaxially mounted to an outward end of the pin;
   said plug is operably mounted within a cylinder for movement between a locked position within the cylinder and an unlocked position projected at least partially out of the cylinder; and
   said lock cylinder is mounted within the bore and coaxial therewith.

7. A security device for a kingpin, comprising:
   a vertically-oriented tube having upper and lower ends and an inner diameter sufficient to slidably receive a kingpin of predetermined dimensions therein;
   a conical shaped mounted on the tube and tapering from a large diameter at an upper end to a small diameter at a lower end;
   said shell having a central axis coaxial with a central axis of the tube, and including a plurality of gussets projecting outwardly from the tube; and
   an operable lock mounted on said tube, said lock operable between a locked position securing a horizontal pin in a first position projecting within an interior cavity of the tube, and an unlocked position permitting movement of the pin to a second position withdrawn from the interior cavity of the tube.

* * * * *